US012780051B2

(12) United States Patent
Raybern

(10) Patent No.: US 12,780,051 B2
(45) Date of Patent: Nov. 3, 2026

(54) SEAT POSITIONING SYSTEM

(71) Applicant: Textron Aviation Inc., Wichita, KS (US)

(72) Inventor: Blake David Raybern, Wichita, KS (US)

(73) Assignee: Textron Aviation Inc., Providence, RI (US)

( * ) Notice: Subject to any disclaimer, the term of this patent is extended or adjusted under 35 U.S.C. 154(b) by 365 days.

(21) Appl. No.: 18/410,826

(22) Filed: Jan. 11, 2024

(65) Prior Publication Data

US 2024/0239245 A1 Jul. 18, 2024

Related U.S. Application Data

(60) Provisional application No. 63/479,645, filed on Jan. 12, 2023.

(51) Int. Cl.

| | |
|---|---|
| ***B60N 2/07*** | (2006.01) |
| ***B60N 2/08*** | (2006.01) |
| ***B60N 2/14*** | (2006.01) |

(52) U.S. Cl.

CPC ............. *B60N 2/07* (2013.01); *B60N 2/0812* (2013.01); *B60N 2/0881* (2013.01); *B60N 2/146* (2013.01)

(58) Field of Classification Search

CPC .... B60N 2002/0212; B60N 2002/0216; B60N 2002/022; B60N 2/07; B60N 2/0717; B60N 2/06; B60N 2/062

See application file for complete search history.

(56) References Cited

U.S. PATENT DOCUMENTS

| | | | | |
|---|---|---|---|---|
| 2,941,630 | A | 6/1960 | Anderson | |
| 4,586,341 | A | 5/1986 | Kobus | |
| 4,756,502 | A | 7/1988 | Egan | |
| 5,161,765 | A * | 11/1992 | Wilson .................. | B60N 2/062 296/65.13 |
| 5,484,190 | A | 1/1996 | Corrion et al. | |
| 5,544,939 | A | 8/1996 | Baret et al. | |
| 5,568,960 | A | 10/1996 | Oleson et al. | |
| 5,630,338 | A | 5/1997 | Patterson et al. | |
| 5,674,142 | A | 10/1997 | Jordan | |
| 5,733,006 | A | 3/1998 | Woods | |
| 6,045,187 | A | 4/2000 | Stumpf | |
| 6,419,312 | B1 | 7/2002 | Flannery et al. | |

(Continued)

FOREIGN PATENT DOCUMENTS

| | | | |
|---|---|---|---|
| CN | 118744666 | A | 10/2024 |
| DE | 19828305 | A1 | 3/1999 |

(Continued)

*Primary Examiner* — Milton Nelson, Jr.

(74) *Attorney, Agent, or Firm* — Avek IP, LLC

(57) ABSTRACT

A system for positioning a seat and locking it into a desired position. The system may include a seat mounted to a plurality of movable track members that allow an occupant to position a seat. The track members may be locked in place with one or more spring biased locking mechanisms that selectively engage the track members to keep the seat fixed in a desired position. The locking members may be engaged or disengaged using a series of cables. In one embodiment, a master cable is run to a handle on the side of the seat, which can be manipulated by an occupant to selectively engage and disengage the locking mechanisms.

20 Claims, 17 Drawing Sheets

(56) References Cited

U.S. PATENT DOCUMENTS

| | | | | |
|---|---|---|---|---|
| 6,691,970 | B1 * | 2/2004 | Sutton, Sr. | B60N 2/14 248/425 |
| 6,938,957 | B2 | 9/2005 | Beatty et al. | |
| 7,077,773 | B2 | 7/2006 | Chapman et al. | |
| 7,108,325 | B2 * | 9/2006 | Williamson | B60N 2/08 297/344.22 |
| 7,600,732 | B2 | 10/2009 | Kennedy | |
| 7,628,244 | B2 | 12/2009 | Chino et al. | |
| 8,727,441 | B1 | 5/2014 | Giasson et al. | |
| 8,998,326 | B2 | 4/2015 | DeCraene et al. | |
| 9,010,860 | B2 * | 4/2015 | Kume | B60N 2/02246 297/344.1 |
| 9,296,318 | B2 | 3/2016 | Ootsuka et al. | |
| 9,493,242 | B2 | 11/2016 | Oleson et al. | |
| 9,592,914 | B2 | 3/2017 | Erhel et al. | |
| 9,767,773 | B2 | 9/2017 | Bedson | |
| 10,011,197 | B2 | 7/2018 | Ferguson et al. | |
| 10,266,270 | B2 | 4/2019 | Becker et al. | |
| 10,399,467 | B2 | 9/2019 | Theander et al. | |
| 10,583,926 | B2 * | 3/2020 | Erhel | B60N 2/14 |
| 11,486,168 | B2 | 11/2022 | Oyama et al. | |
| 2006/0049679 | A1 | 3/2006 | Blendea | |
| 2006/0108848 | A1 | 5/2006 | Williamson et al. | |
| 2010/0326333 | A1 | 12/2010 | St. Louis | |
| 2017/0297720 | A1 | 10/2017 | Davis et al. | |
| 2018/0036198 | A1 | 2/2018 | Mergl et al. | |
| 2018/0043798 | A1 | 2/2018 | Jacobson et al. | |
| 2024/0240695 | A1 | 7/2024 | Raybern | |
| 2024/0253530 | A1 | 8/2024 | Raybern | |
| 2024/0255017 | A1 | 8/2024 | Raybern | |
| 2025/0058879 | A1 | 2/2025 | Raybern | |

FOREIGN PATENT DOCUMENTS

| | | | |
|---|---|---|---|
| DE | 19800858 | A1 | 4/1999 |
| DE | 102004040881 | A1 | 3/2006 |
| EP | 0636759 | A1 | 2/1995 |
| EP | 2436553 | A2 | 4/2012 |
| FR | 2760711 | A1 | 9/1998 |
| GB | 191208377 | A | 4/1913 |
| JP | 2001206119 | A | 7/2001 |
| WO | 2008138138 | A1 | 11/2008 |

* cited by examiner

SEAT POSITIONING SYSTEM

CROSS-REFERENCE TO RELATED APPLICATION

This application claims the benefit of U.S. provisional application Ser. No. 63/479,645, filed Jan. 12, 2023, titled SEAT POSITIONING SYSTEM.

FIELD

The present invention relates generally to a system for adjusting a seat and locking it into a desired position.

BACKGROUND

Various technologies exist that allow seats in vehicles to be adjusted to a desired position by an occupant. For example, seats on board aircraft may utilize a track system that allows the seat to be adjusted forward and backward as well as side to side. The seat may also be capable of rotating or swiveling. Existing seat adjustment systems are sometimes criticized as allowing too much seat movement after the position is locked in place. The also tend to have a configuration that makes it hard to tighten the adjustment systems to minimize seat movement.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Embodiments of the invention are defined by the claims below, not this summary. A high-level overview of various aspects of the invention is provided here to introduce a selection of concepts that are further described in the detailed description section below. In brief, this disclosure describes, among other things, systems and methods for adjusting a seat and locking it into a desired position. A device for adding tension to a wire or cable is generally described as well. Other aspects and advantages of the invention will be apparent from the following detailed description of the embodiments and the accompanying drawing figures.

The invention relates to a system for adjusting a seat and locking it into a desired position. In one embodiment, the seat positioning system comprises a frame with a seat portion and a backrest portion where the seat portion is defined by a front, a back, a first side, and a second side. The back of the seat is proximate the backrest and the first and second sides of the seat extend from the front to the back of the seat. A plurality of movable track members may be used to allow an occupant to position the seat. The tracks can take a number of forms including a tubular configuration. There may be at least two tracks oriented generally perpendicular to each other. The tracks may include serrations that engage with serrations on associated locking mechanisms. A first locking mechanism can have a plurality of serrations that engage with at least some of the serrations on the first track. There may be a second locking mechanism also having a plurality of serrations that engage with at least some of the serrations on the second track.

The seat positioning system may also include a triggering mechanism adapted to operate the first and second locking mechanisms. The triggering mechanism may include first and second flexible members connected to a lever. The first end of the first flexible member can be connected to the lever while a second end of the flexible member can be connected to the first locking mechanism. The first end of the second flexible member can be connected to the same lever while a second end of the flexible member can be connected to the second locking mechanism. A handle may be used to disengage the first and second locking mechanisms. The handle can be located in numerous places such as proximate the seat portion of the frame.

In another embodiment, the seat positioning system may include a third track oriented generally perpendicular to the first track described above. The third track could have serrations that engage with serrations on an associated locking mechanism similar to the first and second tracks. A third locking mechanism can have a plurality of serrations that engage with at least some of the serrations on the third track. If a third locking mechanism is included, the triggering mechanism could also operate the third locking mechanism and the handle could be used to also disengage the third locking mechanism. The triggering mechanism would include a third flexible member, where the first end of the third flexible member is connected to the lever while a second end of the flexible member is connected to the third locking mechanism. The amount of tension in the first, second, and third flexible members can be adjusted using barrel adjusters mounted to the lever.

In another embodiment, the seat positioning system may incorporate a rotatable plate mounted to a bottom support structure where the rotatable plate is movable with respect to the bottom support structure. A locking pin can be used to prevent movement of the rotatable plate with respect to the bottom support structure. To prevent movement, the locking pin can be received within an aperture formed in the bottom support structure. The handle that is used to disengage the locking mechanisms as described above, may also be used to operate the locking pin. The locking pin may be spring biased in a downward position such that it will automatically insert into an aperture in the bottom support when above such an aperture. The locking pin may also have a tapered shape (i.e., tapered sidewall) to assist with insertion into an aperture.

DETAILED DESCRIPTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," "leftwardly," "upper," and "lower" will refer to the installed position of the item to which the reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
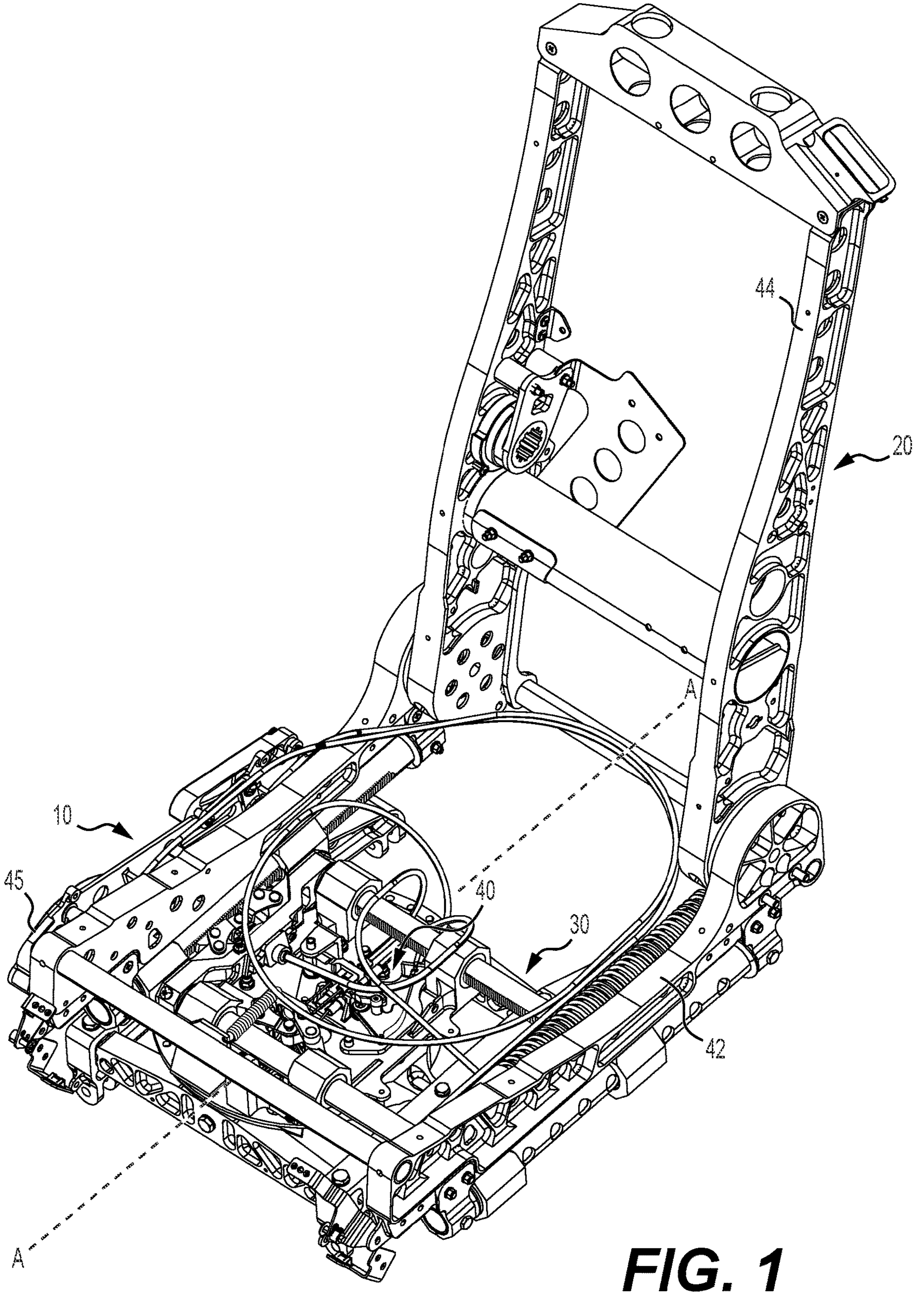
FIG. 1 is a perspective view of a seat frame assembly.

An exemplary embodiment of the invention is shown in the figures. Referring first to FIG. 1, the invention comprises a seat positioning system 10 mounted to a seat frame 20. The seat positioning system 10 may include a track system 30 and a position locking system 40. Frame 20 may have a seat portion 42 and a backrest portion 44 as well as a disengagement handle 45 attached to a side of the seat portion 42. Seat portion 42 may have a longitudinal axis running from front to back and through the midpoint of seat portion 42 as shown by axis A-A in FIG. 1. As best seen in FIGS. 4-8, seat positioning system 10 may also be mounted to a bottom support 48 that can be attached to a vehicle or other structure (not shown).

Figure 2:
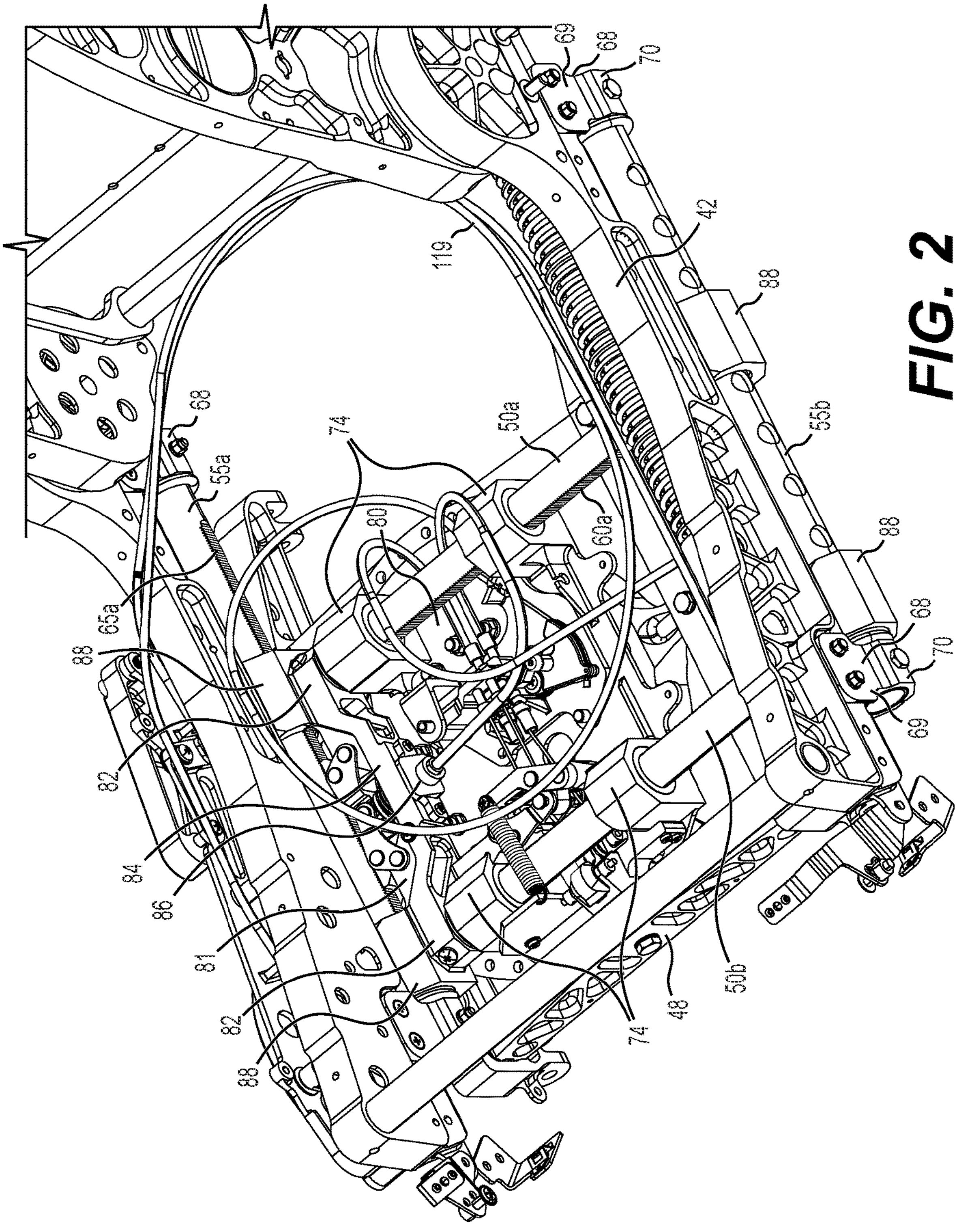
FIG. 2 is a side perspective view of a seat positioning system.
Figure 4:
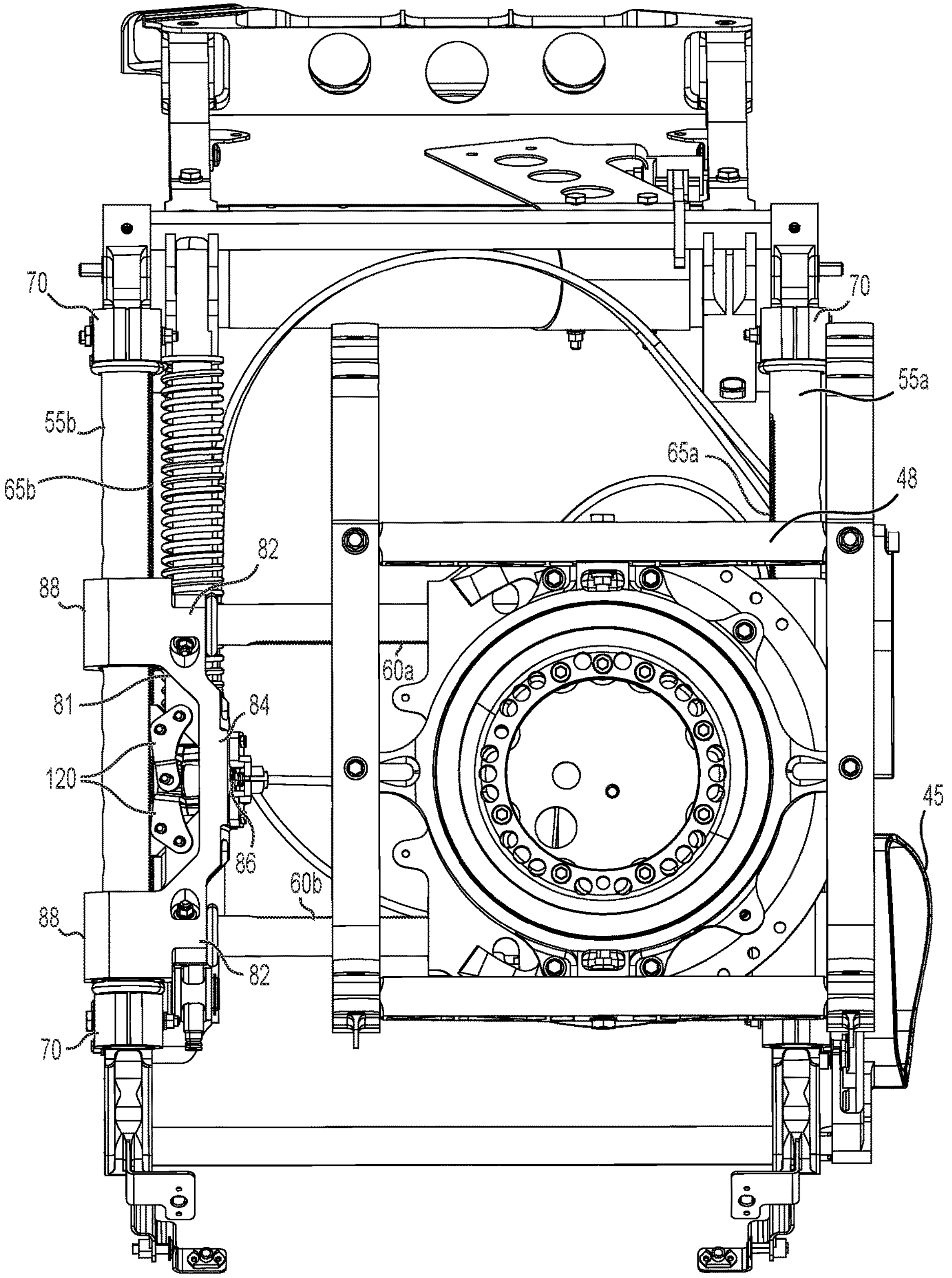
FIG. 4 is a bottom view of the seat positioning system of FIG. 2.
Figure 5:
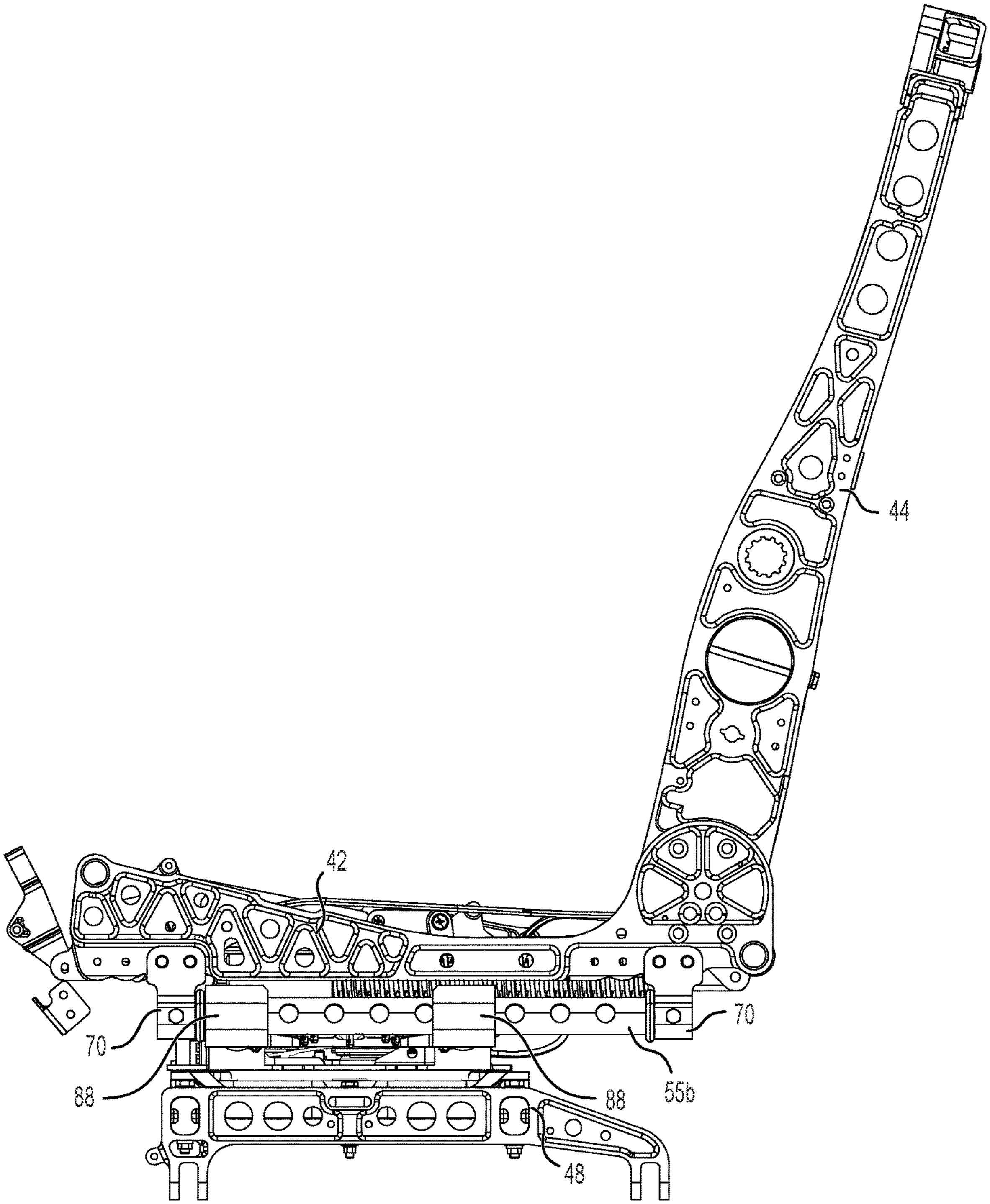
FIG. 5 is a first side view of the seat frame assembly of FIG. 1.
Figure 6:
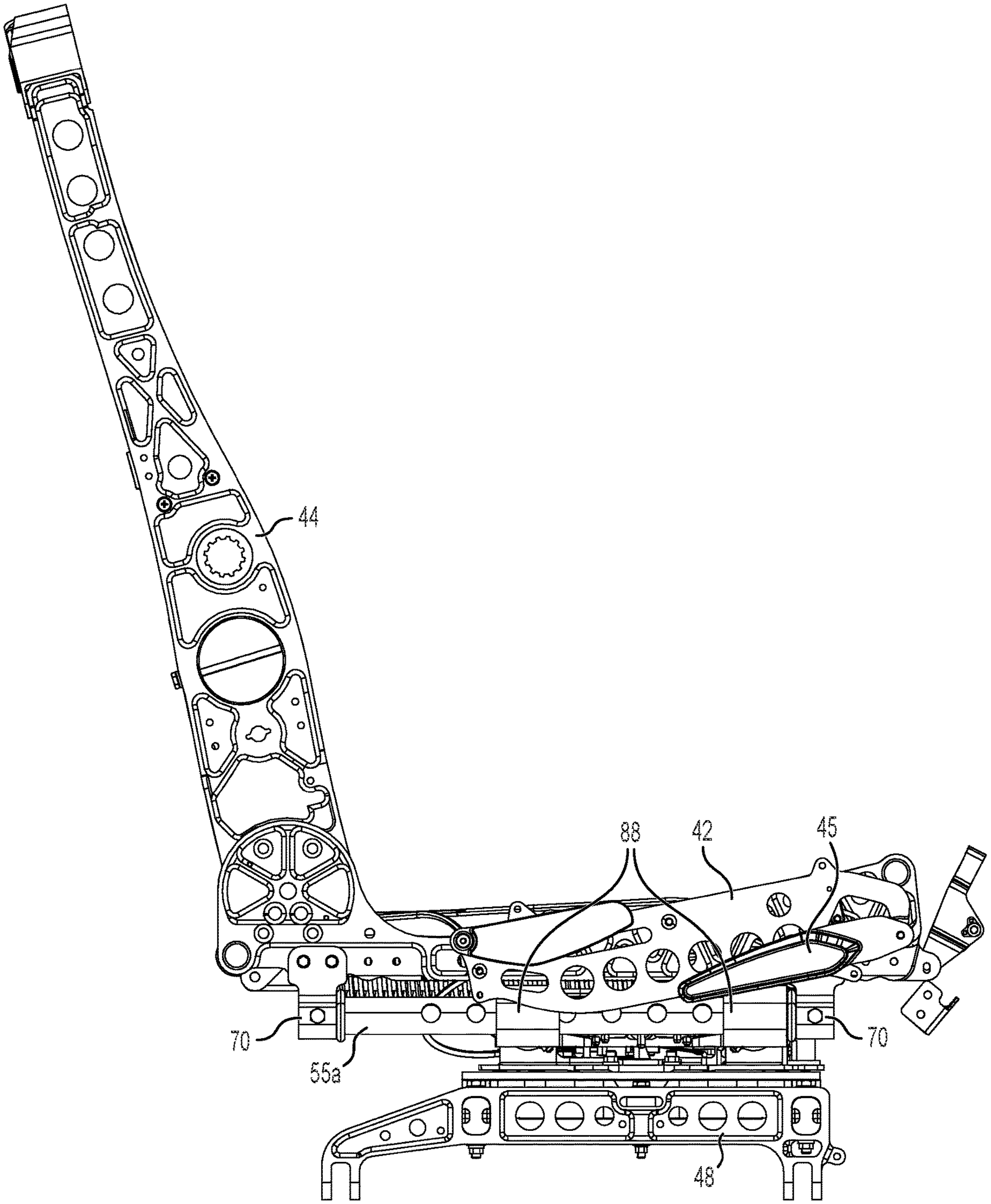
FIG. 6 is a second side view of the seat frame assembly of FIG. 1.
Figure 7:
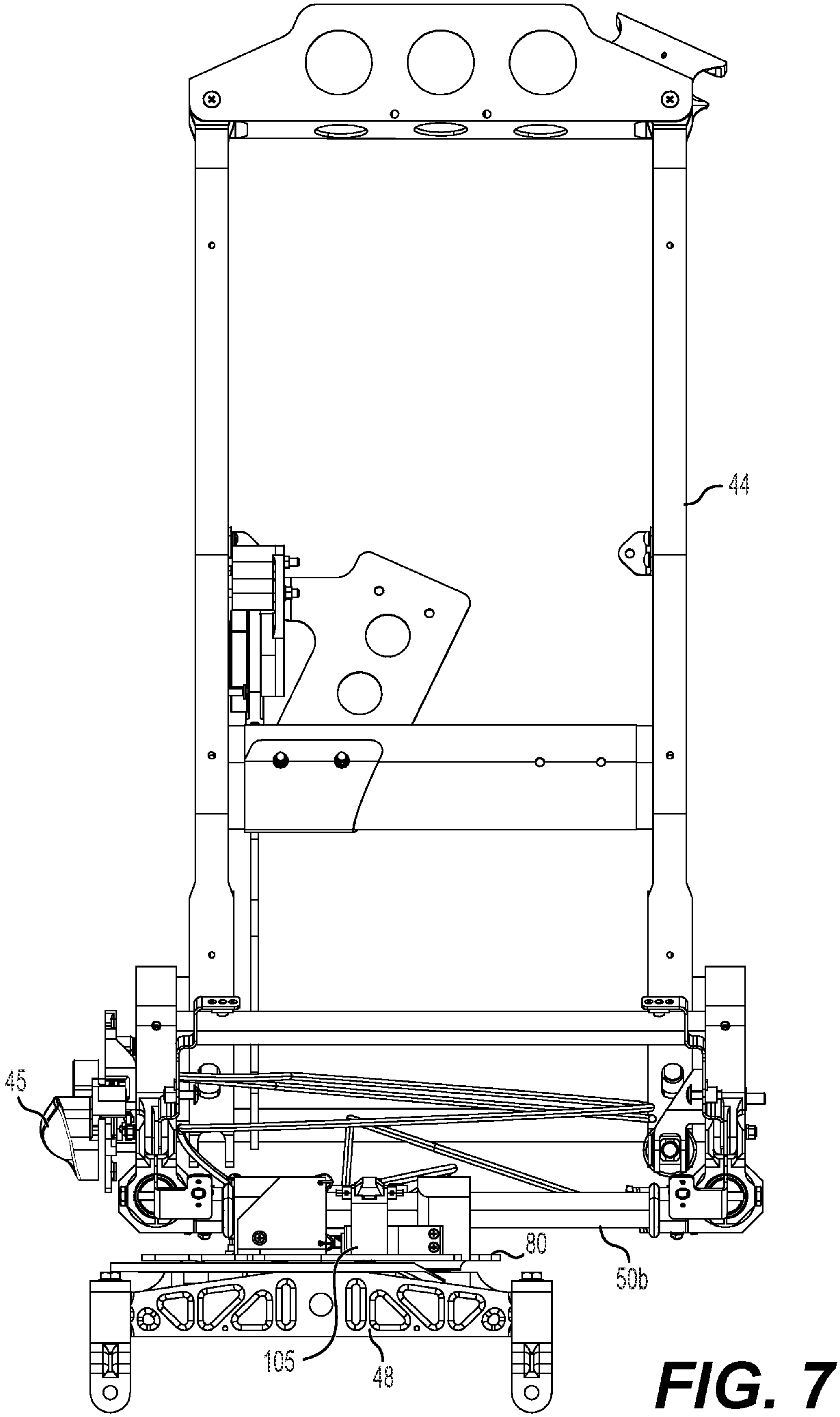
FIG. 7 is a front view of the seat frame assembly of FIG. 1.
Figure 8:
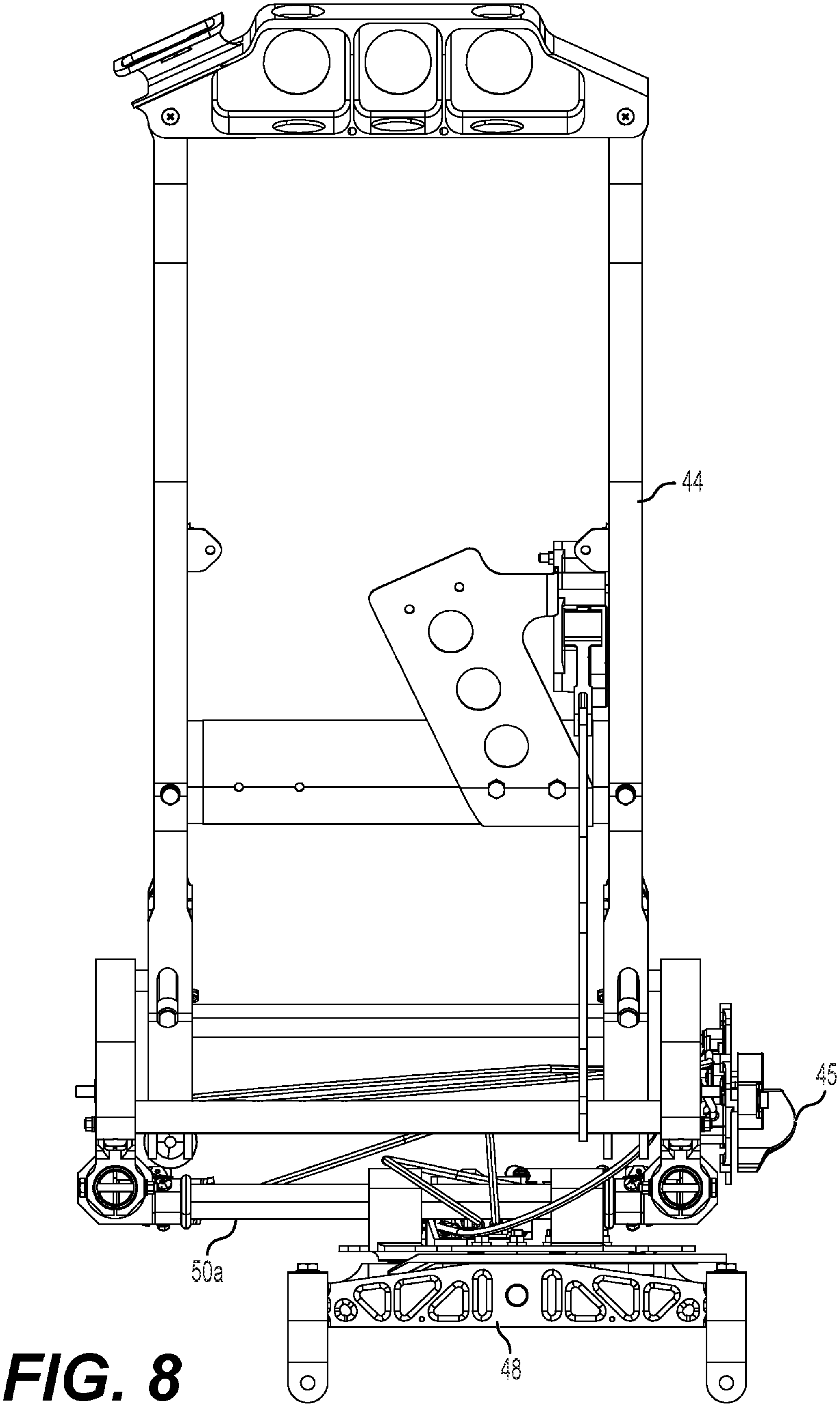
FIG. 8 is a back view of the seat frame assembly of FIG. 1.

As shown in FIG. 2, track system 30 includes at least two pairs of tracks. There are two generally parallel transverse tracks 50*a* and 50*b* running crosswise with respect to the seat portion 42 of frame 20. Perpendicular to tracks 50*a* and 50*b* are two generally parallel longitudinal tracks 55*a* and 55*b*. Tracks 50*a*, 50*b*, 55*a* and 55*b* may take any number of forms with a generally linear form working well in the exemplary embodiment. The tracks may have circular or rectangular cross-sectional shapes and they may be hollow or solid. As shown in the figures, generally cylindrical shapes are suitable for the exemplary embodiment with some of the tracks being hollow or tubular to minimize the weight of track system 30. Each of tracks 50*a*, 50*b*, 55*a* and 55*b* have a planar strip of serrations or teeth on a longitudinal side of the track. Tracks 50*a* and 50*b* have serrations or teeth 60*a* and 60*b* respectively. Tracks 55*a* and 55*b* have serrations or teeth 65*a* and 65*b* respectively. As best seen in FIGS. 2 and 4, serrations 60*a*, 60*b*, 65*a* and 65*b* may be located along an inward facing side of their respective track, which allows other parts of the system to engage the serrations as described below.

As shown in FIG. 2, longitudinal tracks 55*a* and 55*b* may be located below the sides of the seat portion 42 of frame 20. Seat portion 42 may be secured to tracks 55*a* and 55*b* using brackets 68, which include an upper fastening structure 69 and a lower collar 70. Fastening structure 69 may be secured to seat portion 42 using any number of securing mechanisms such as bolts, rivets or welding. Collar 70 is attached to and located below fastening structure 69. Collar 70 is sized to receive an end of track 55*a* or 55*b* with the end being securable within collar 70. In the exemplary embodiment, the end of the track may be bolted into collar 70. As shown in the figures, tracks 55*a* and 55*b* are secured to seat portion 42 with a bracket 68 at each end of the tracks.

Also shown in FIG. 2, transverse tracks 50*a* and 50*b* may be supported by a plurality of stands 74. Each of the stands 74 can be mounted to swivel plate 80. As will be discussed in more detail below, swivel plate 80 is a rotatable plate mounted to bottom support 48. Each stand 74 includes a housing with an internal collar that holds its respective track above the swivel plate 80. In the exemplary embodiment, each track 50*a* and 50*b* has two stands 74 holding the track. Tracks 50*a* and 50*b* are able to move through the collars in stands 74 with relatively little effort, which allows the tracks to be selectively positioned with respect to the stands by an occupant of the seat. The collars in stands 74 may include ball bearings or other mechanisms that allow relatively free movement of the tracks.

Tracks 50*a*, 50*b*, 55*a* and 55*b* are joined by an endpiece 81 secured to each end of transverse tracks 50*a* and 50*b*. As shown in FIGS. 2 and 4, each endpiece 81 includes two sleeves 82 for receiving ends of transverse tracks 50*a* and 50*b*. Each end of tracks 50*a* and 50*b* is securable within a sleeve 82. In the exemplary embodiment, the end of the track may be bolted into the sleeve. The sleeves 82 are joined by a bridge piece 84, which includes an aperture 86 proximate its midpoint through which cabling may run as discussed in more detail below. Extending from the back sides of sleeves 82 are collars 88 which are oriented to hold a track 55 generally perpendicular to the transverse tracks 50*a* and 50*b*. Tracks 55*a* and 55*b* are able to move through the collars 88 on each endpiece 81 with relatively little effort, which allows the tracks to be selectively positioned with respect to the endpiece 81 by an occupant of the seat. The collars 88 may include ball bearings or other mechanisms that allow relatively free movement of the tracks.

As shown in FIGS. 2, 3, 9 and 17, position locking system 40 includes a triggering mechanism that includes cables engaged with several locking mechanisms. More specifically, disengagement cables 90*a* and 90*b* are connected to side locking mechanisms 92*a* and 92*b*, and disengagement cable 95 is connected to front locking mechanism 98. Cable 100 is connected to swivel lock mechanism 105. Cables 90*a* and 90*b* may take the form of flexible wires routed through semi-rigid, yet bendable, conduit or sheaths (e.g., Bowden cables). Cables 95 and 100 may also take the form of flexible wires without conduit or sheaths. It is foreseen that other types of cords or flexible structures may be used for the various cables.

Figure 3:
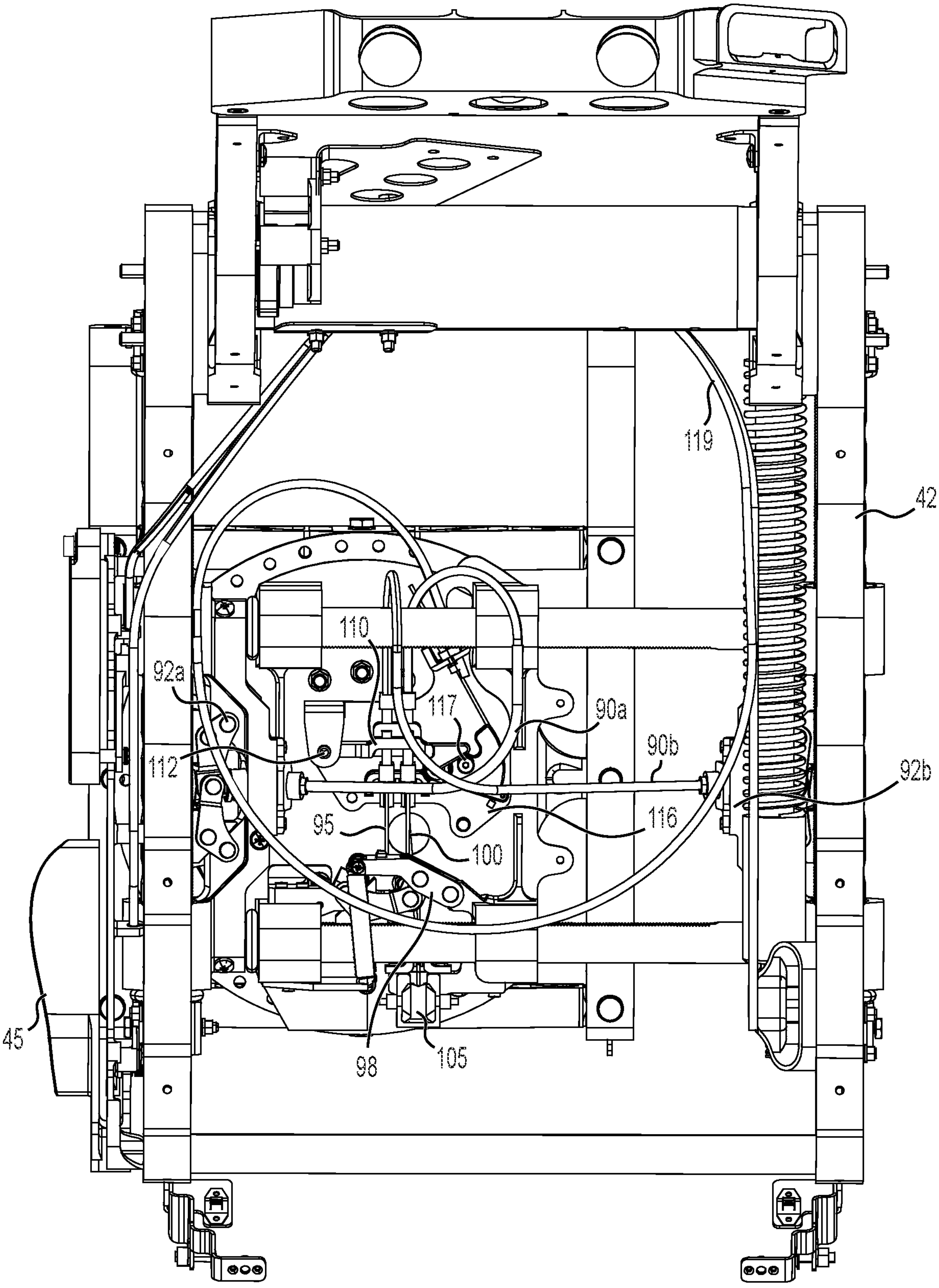
FIG. 3 is a top view of the seat positioning system of FIG. 2.
Figure 17:
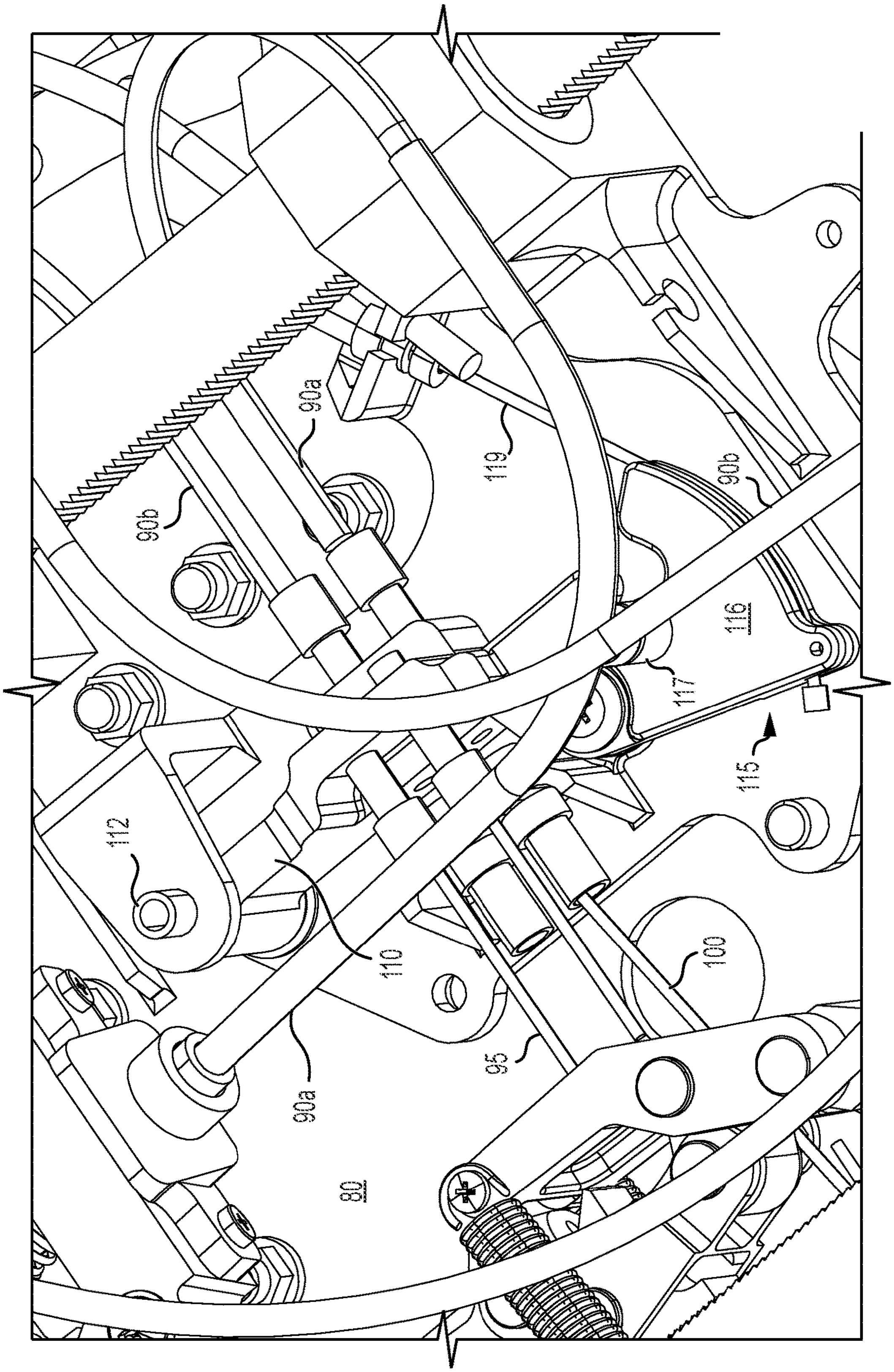
FIG. 17 is an enlarged top perspective view of the hub of the seat positioning system of FIG. 2.

As best seen in FIGS. 3 and 17, one end of each of the cables 90*a*, 90*b*, 95 and 100 may be secured to a hub 110 to form a triggering mechanism to activate the various locking mechanisms. Hub 110 may take any number of forms including a lever mounted to the swivel plate 80 proximate the central portion of the plate. In a preferred embodiment, hub 110 is a lever that is secured at one end to swivel plate 80 such that the lever can rotate in a plane that is generally parallel to the plate. When hub 110 rotates around its pivot point 112, it increases the tension forces in cables 90*a*, 90*b*, 95 and 100 thereby causing the cables to pull on their respective locking mechanisms. Each of the cables 90*a*, 90*b*, 95 and 100 may include tension adjusters such as barrel adjusters at their attachment points to allow the cables to be tensioned as desired. It may be desirable to adjust the cables such that those requiring more force for activation are acted on by the hub after those requiring less force. The reason for this is that handle 45, which disengages locking system 40, may be configured such that higher forces can be applied to the hub 110 more comfortably later in the handle pulling process.

As best seen in FIGS. 3 and 17, hub 110 may be activated by a swing plate 115. Swing plate 115 may take any number of forms such as a rotatable plate 116 having a cylindrical stub 117 that presses on the distal end of hub 110 to rotate the hub. Stub 117 may contact an angled face on hub 110, which allows the stub to maintain contact as both the hub 110 and swing plate 115 are rotating. Hub 110 may be designed to rotate as much as desired when activated, however it is foreseen that a rotation of approximately fifteen degrees around the pivot point 112 is suitable for some applications. Swing plate 115 may be rotated by a master activation cable 119 tied to the distal end of plate 116 and also to handle 45. Activation cable 119 may have the same conduit and internal wire configuration as cables 90*a* and 90*b*.

As best seen in FIGS. 9, 10, 14 and 15 side locking mechanisms 92*a* and 92*b* may utilize mechanical linkages comprising two opposing levers 120 connected at their distal ends with a pin 122 around which they can rotate. Each lever 120 is also anchored at a pivot point 124 opposite its distal end. Attached to each lever 120 between the pivot point 124 and pin 122 is a block 128 having serrations or teeth adapted to engage the serrations 65 on either of the longitudinal tracks 55. When the serrations on block 128 are engaged with the serrations on longitudinal tracks 55*a* or 55*b*, block 128 acts as a stop or catch to keep that respective track from moving with respect to the locking mechanism and endpiece 81. Side locking mechanisms 92*a* and 92*b* further comprise a spring 130 in a compressed state located between pin 122 and the bridge 84 of endpiece 81. Because spring 130 is compressed it pushes pin 122 away from bridge 84 and toward longitudinal track 55*a* or 55*b*. Levers 120 are biased toward track 55*a* or 55*b* because they tend to rotate around their pivot points 124 as their distal ends (which are both connected to pin 122) are pushed toward the track. This causes blocks 128 to also be biased toward the track and engage with the serrations on the track. Accordingly, when side locking mechanisms 92*a* and 92*b* are in their default position, blocks 128 are engaged with longitudinal tracks 55*a* and 55*b* thereby locking the track in place. When the spring 130 bias is overcome, as will be discussed in more detail below, pin 122 moves away from the track, thus rotating levers 120 away from the track. When levers 120 rotate away, they move blocks 128 away from the track to disengage the lock on the tracks. Blocks 128 may move away from the track by sliding back on an angled backstop 135 as the blocks are pulled by their respective levers 120. The angled backstop 135 allows block 128 to stay properly oriented to engage with the track for locking.

Figure 9:
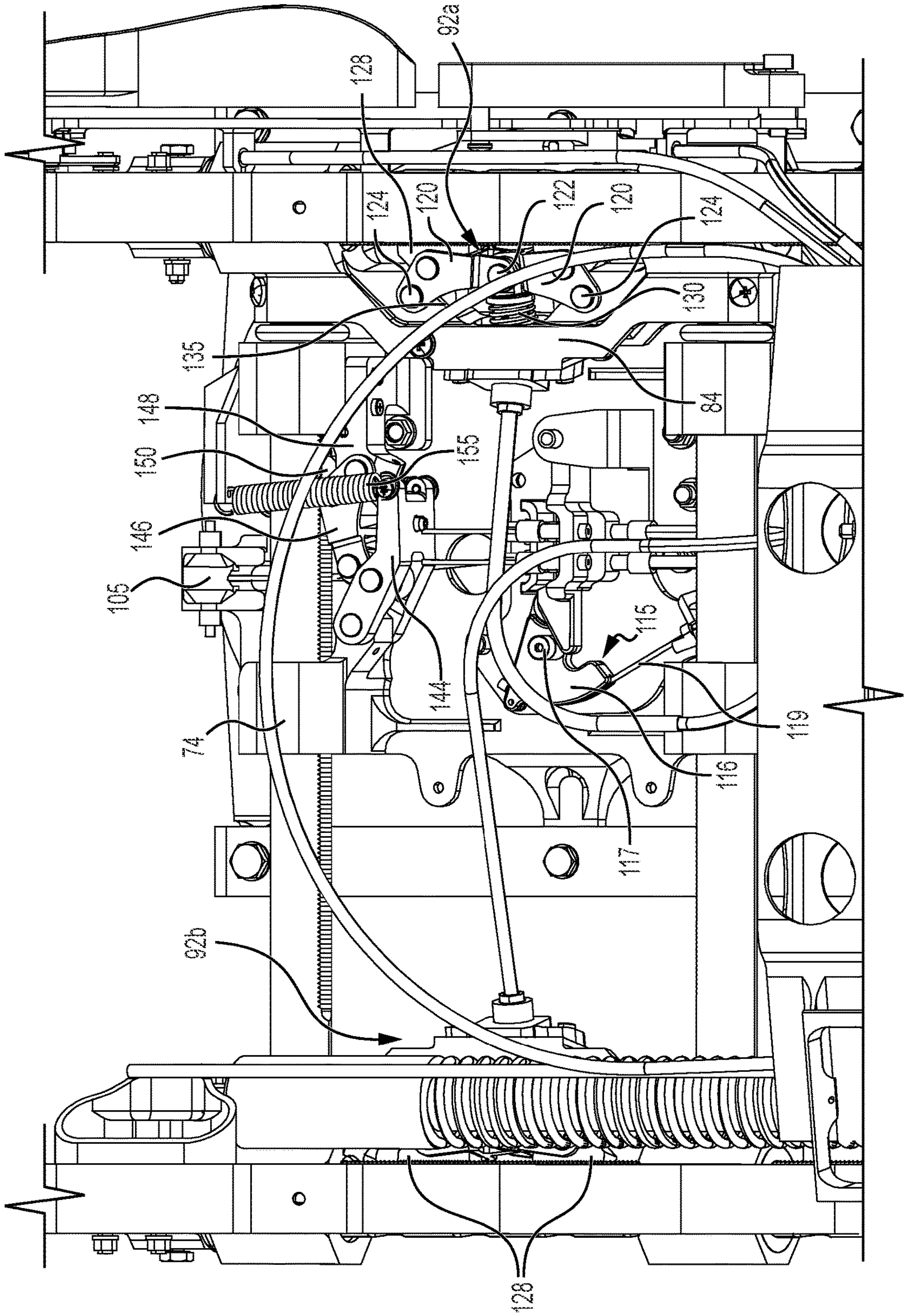
FIG. 9 is an enlarged back perspective view of the seat positioning system of FIG. 2.
Figure 10:
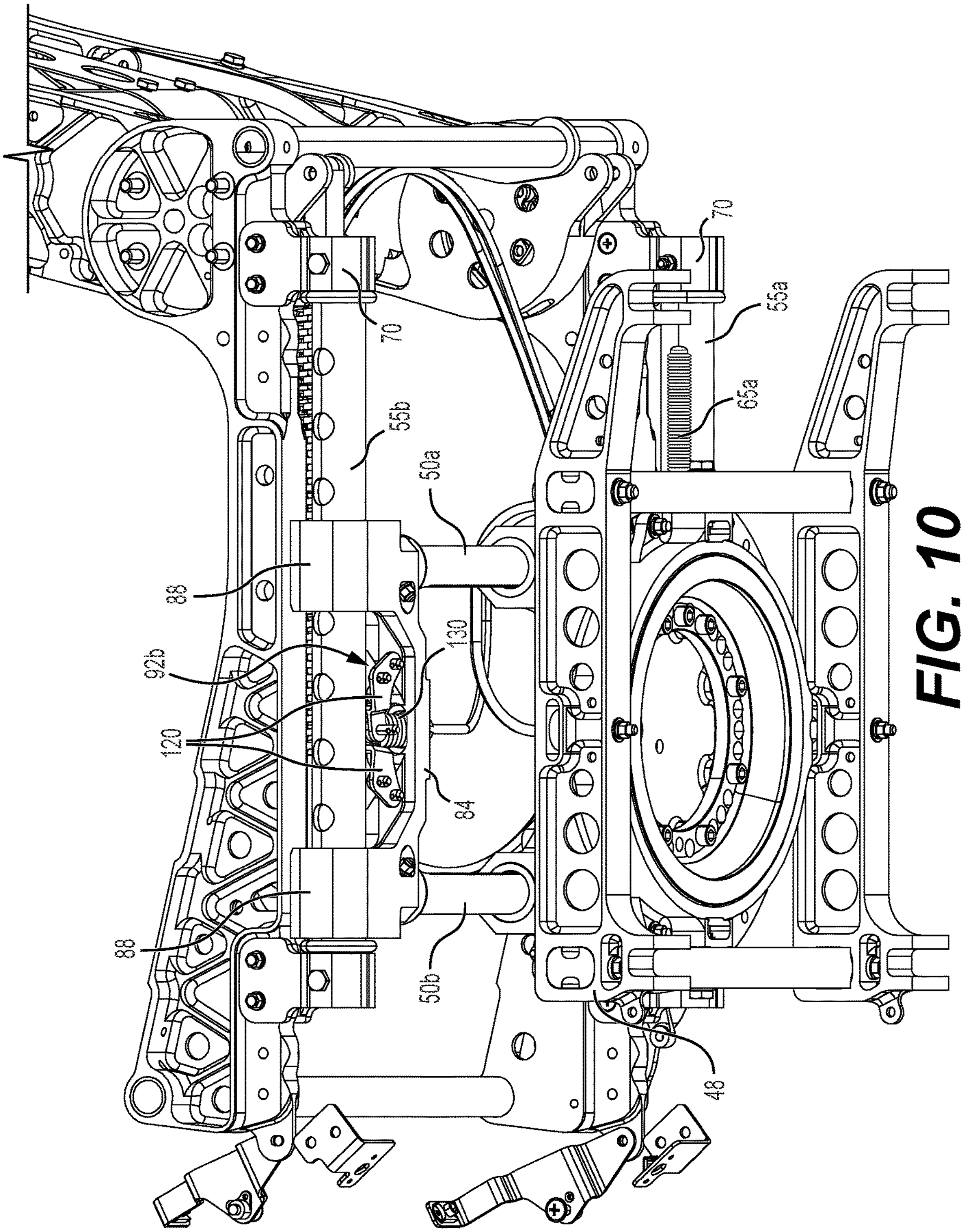
FIG. 10 is bottom perspective view of the seat positioning system of FIG. 2.
Figure 16:
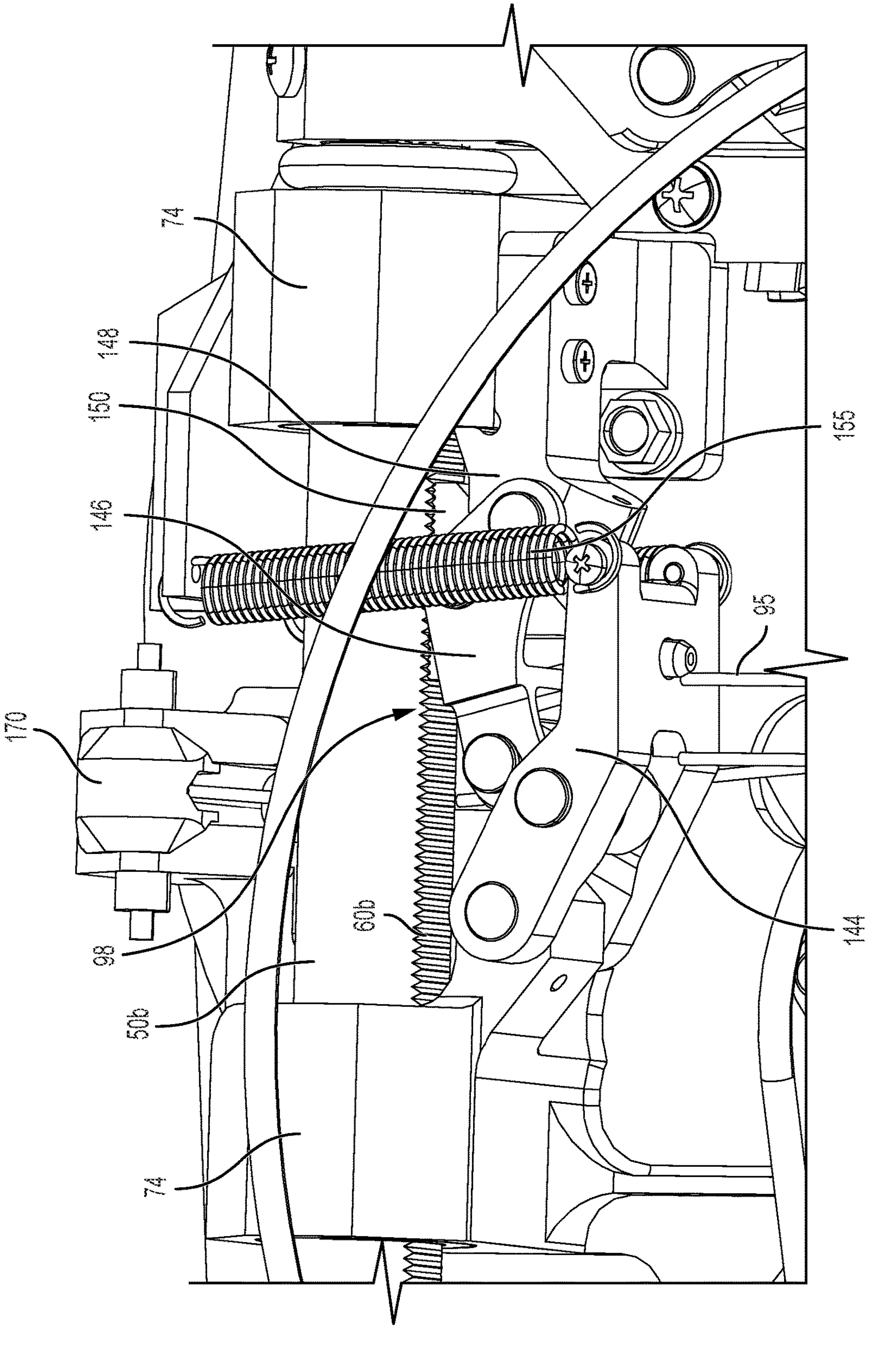
FIG. 16 is an enlarged top perspective view of the front locking mechanism of the seat positioning system of FIG. 2.

As best seen in FIGS. 9 and 16, front locking mechanism 98 may utilize a mechanical linkage comprising two interlocking levers. The first, activating lever 144, is rotatably connected to a portion of a stand 74 holding a transverse track 50*a* or 50*b*. The second, locking lever 146, is rotatably connected to a mount 148 extending from a corresponding stand 74 holding the same transverse track 50*a* or 50*b*. The distal end of locking lever 146 is rotatably secured to a central portion of activating lever 144 such that moving one lever will move the other lever. Locking lever 146 may be directly connected to activating lever 144 or there may be a linkage that connects the two levers. Attached to locking lever 146 between its anchor point and distal end is a block 150 having serrations or teeth adapted to engage the serrations on a transverse track 50. When the serrations on block 150 are engaged with the serrations on transverse tracks 50*a* or 50*b*, block 150 acts as a stop or catch to keep that track from moving with respect to the front locking mechanism 98.

Front locking mechanism 98 further comprises one or more stretched springs 155 spanning between the distal end of activating lever 144 and an anchor position on the far side of the transverse track being engaged. Because spring 155 is stretched it pulls the end of activating lever 144 toward the transverse track. Levers 144 and 146 are biased toward the transverse track because they tend to rotate toward the track due to spring 155 pulling activating lever 144, and therefore locking lever 146, toward the track. This causes block 150 to also be biased toward the track and engage with the serrations on the track. Accordingly, when front locking mechanism 98 is in its default position, block 150 is engaged with transverse track 50*a* or 50*b* thereby locking the track in place. When the spring 155 bias is overcome, as will be discussed in more detail below, levers 144 and 146 move away from the track, thus moving block 150 away from the track to disengage the lock. Block 150 may move away from the track by sliding back on an angled face of mount 148 as the block is pulled by locking lever 146. The angled face allows block 150 to stay properly oriented to engage with the track for locking.

Figure 11:
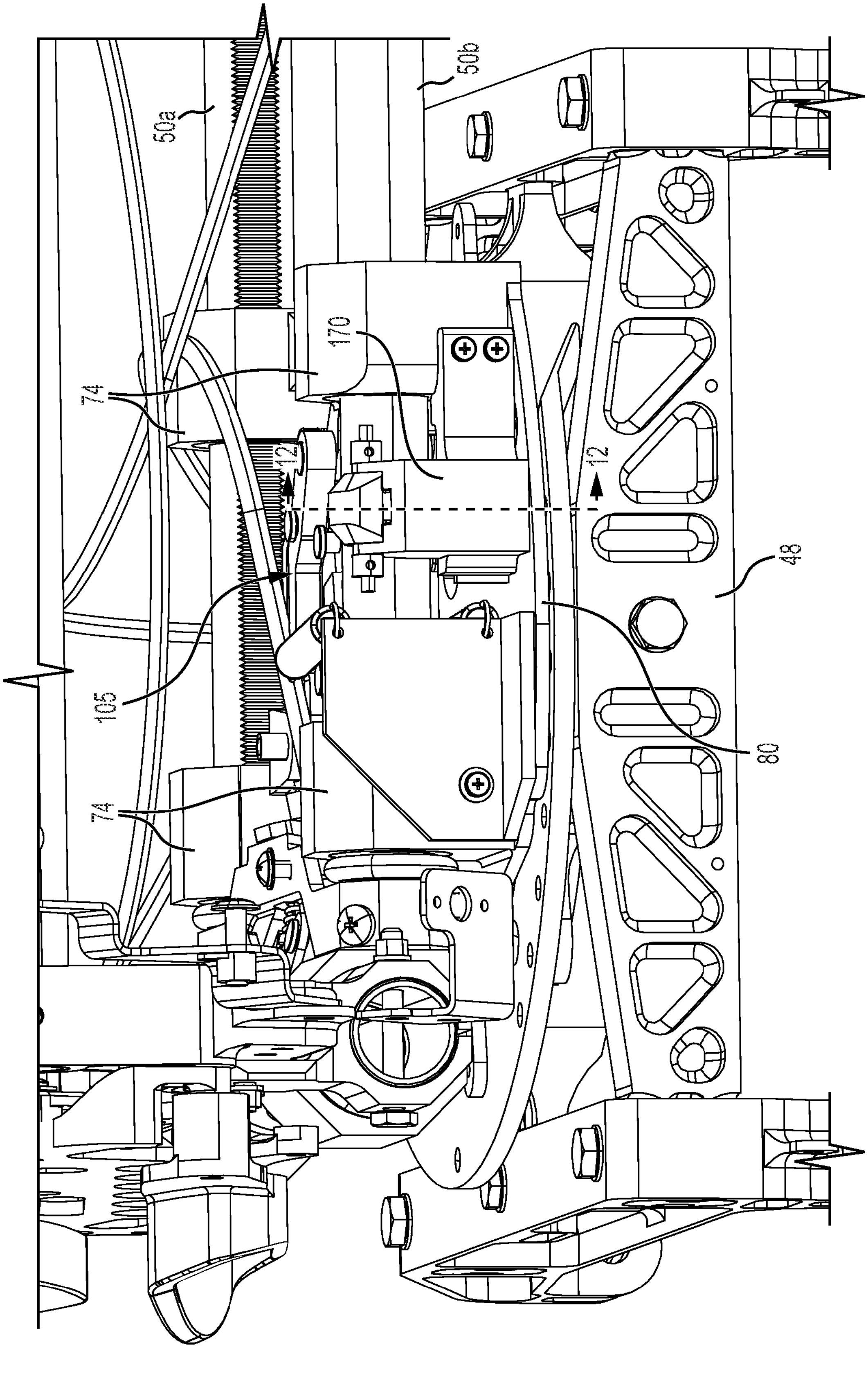
FIG. 11 is a front perspective view of a swivel lock mechanism.
Figure 12:
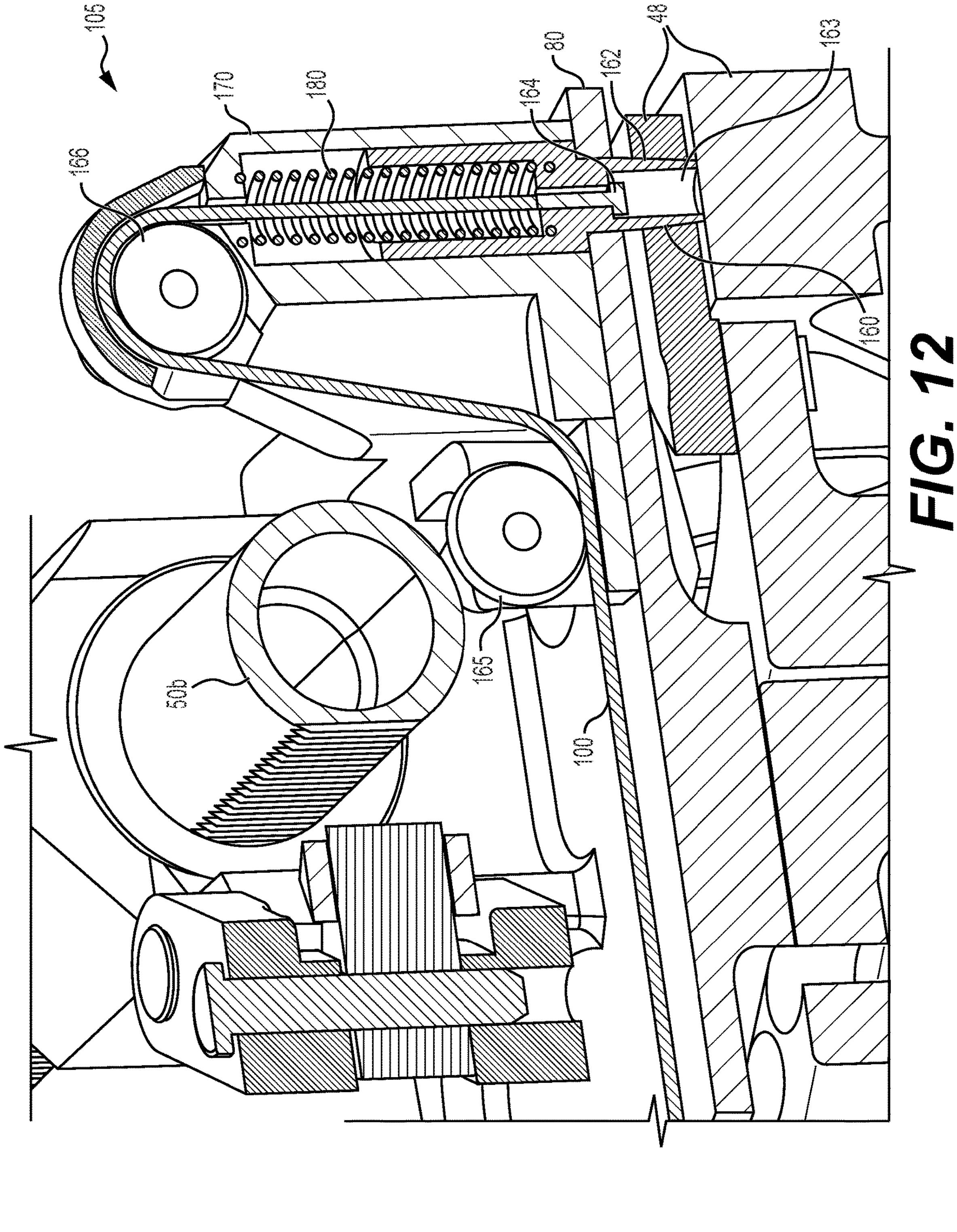
FIG. 12 is a partial cross-sectional view of the swivel lock mechanism taken along line 12-12 of FIG. 11.

As shown in FIG. 11, position locking system 40 may include a swivel lock mechanism 105. As best seen in FIG. 12, swivel lock 105 includes a locking pin 160 and a series of pulleys along with a housing 170. Housing 170 may be attached atop swivel plate 80 and inside housing 170 there may be a locking pin 160 extending downwardly through an aperture in swivel plate 80. Locking pin 160 may have a tapered sidewall 162 that causes the pin to reduce in diameter along its length. Accordingly, the lower or distal end of pin 160 may have a smaller diameter than other portions of the pin.

To swivel seat frame 20 with respect to bottom support 48, locking pin 160 may be retracted within housing 170. To keep seat frame 20 from swiveling, locking pin 160 may be extended downwardly from housing 170 through the aperture in swivel plate 80 and into a corresponding aperture in a portion of the bottom support 48, thereby locking seat frame 20 and track system 30 into a fixed position with respect to bottom support 48. If pin 160 utilizes a tapered configuration as described above, the taper may assist with aligning pin 160 with an aperture in bottom support 48. The taper may cause pin 160 to have a lower end that is smaller in diameter than other parts of the pin, which can cause the diameter of the lower end to be smaller than the diameter of an aperture in bottom support 48. Pin 160 may be easier to locate within the aperture in bottom support 48 since the smaller end of the pin would be smaller than the aperture and could be inserted within the aperture even if the axes of pin 160 and the aperture are not precisely aligned. Because the end of a pin 160 that is tapered would be smaller than the aperture in bottom support 48, pin 160 could be slightly misaligned with the aperture yet still be inserted therein. As the pin 160 extends through the aperture, the tapered sidewall 162 may contact the side of the aperture. Due to the slope of sidewall 162, the axis of pin 160 will move into alignment with the aperture as the tapered sidewall 162 slides against the edge of the aperture.

As shown in FIG. 12, locking pin 160 may be biased downward by a spring 180 such that a locked position is the default. Spring 180 may be located within housing 170 in a compressed state between the housing and pin 160 thereby pushing the pin 160 downward away from the housing 170. To overcome the bias, cable 100 may pull upwardly on pin 160 to retract the pin. Pin 160 may be connected to cable 100 by a fitting 164 secured to the cable and located within a cavity 163 in pin 160. Fitting 164 can take any number of forms including a swage or compression fitting. Fitting 164 would be small enough to reside in cavity 163 but large enough to form a catch that pulls against pin 160 when cable 100 is pulled.

As shown in FIG. 12, the configuration of cable 100 may be such that it is generally horizontal until it reaches the swivel lock mechanism 105. The cable then engages with a first pulley 165 and changes direction to vertical. The cable 100 then engages a second pulley 166, which is elevated, and the cable goes up and over the pulley 166 and then down to locking pin 160. Cable 100 may be routed through a central cavity in spring 180 on the way to locking pin 160.

The seat positioning system 10 may be used by pulling handle 45 attached to a side of the seat portion 42 to disengage the locking system 40. Handle 45 is attached to one end of activation cable 119 while the other end of the cable is attached to swing plate 115. When handle 45 is pulled, tension is added to cable 119 which rotates plate 116 of swing plate 115. When plate 116 is rotated, stub 117 presses against the distal end of hub 110 and the hub rotates. As hub 110 is rotated, it adds tension to the cables 90*a*, 90*b*, 95 and 100.

Because of the conduit and internal wire configuration of the cables 90*a*, 90*b* and 119, tension may be added to the cables by either pulling on the internal wire or pushing on the conduit or sheath. When the conduit is pushed longitudinally at one end while the internal wire is anchored at the same end, the pushing changes the shape and length of the conduit slightly with respect to the internal wire. The effect is that the internal wire tends to retract with respect to the other end of the conduit thus adding tension to the wire. For this technique to work, cables 90*a*, 90*b* and 119 have each end of their conduits fixed to the structure independently of the internal wires. This allows the internal wires to move with respect to the conduit ends, which allows the conduit to be pushed thus forcing the internal wire to retract. Because cables can have tension added either way (i.e., pulling the internal wire or pushing the conduit or sheath), hub 110 is configured to pull on wires for certain cables while simultaneously pushing on conduit for other cables. This allows tension to be added to all cables attached to the hub with a single rotational movement of the hub even though the cables may be attached to opposite sides of the hub. In an exemplary embodiment, the cables are configured such that hub 110 pushes on the conduit of cables 90*a* and 90*b* while pulling on the wires of cables 95 and 100.

As tension is added to cables 90*a* and 90*b*, the springs 130 in side locking mechanisms 92*a* and 92*b* are overcome and levers 120 rotate away from their respective tracks thus moving blocks 128 away from the tracks and disengaging the locks on the tracks. This allows the occupant to position the seat at the desired location along longitudinal track 55*a* and 55*b*.

As tension is added to cable 95, spring 155 in front locking mechanism 98 is overcome and levers 144 and 146 move away from the track, thus moving block 150 away from the track to disengage the front lock. This allows the occupant to position the seat at the desired location along transverse tracks 50*a* and 50*b*.

As tension is added to cable 100, spring 180 in swivel lock mechanism 105 is overcome and locking pin 160 is retracted to disengage the swivel lock. This allows the occupant to rotate the seat to the desired position with respect to the bottom support 48.

Once the occupant has positioned the seat as desired, handle 45 may be released and the springs in the various locking mechanisms will return to their default positions, thus re-engaging side locking mechanisms 92*a* and 92*b*, front locking mechanism 98, and swivel lock mechanism 105 to keep the seat in place.

Figure 13:
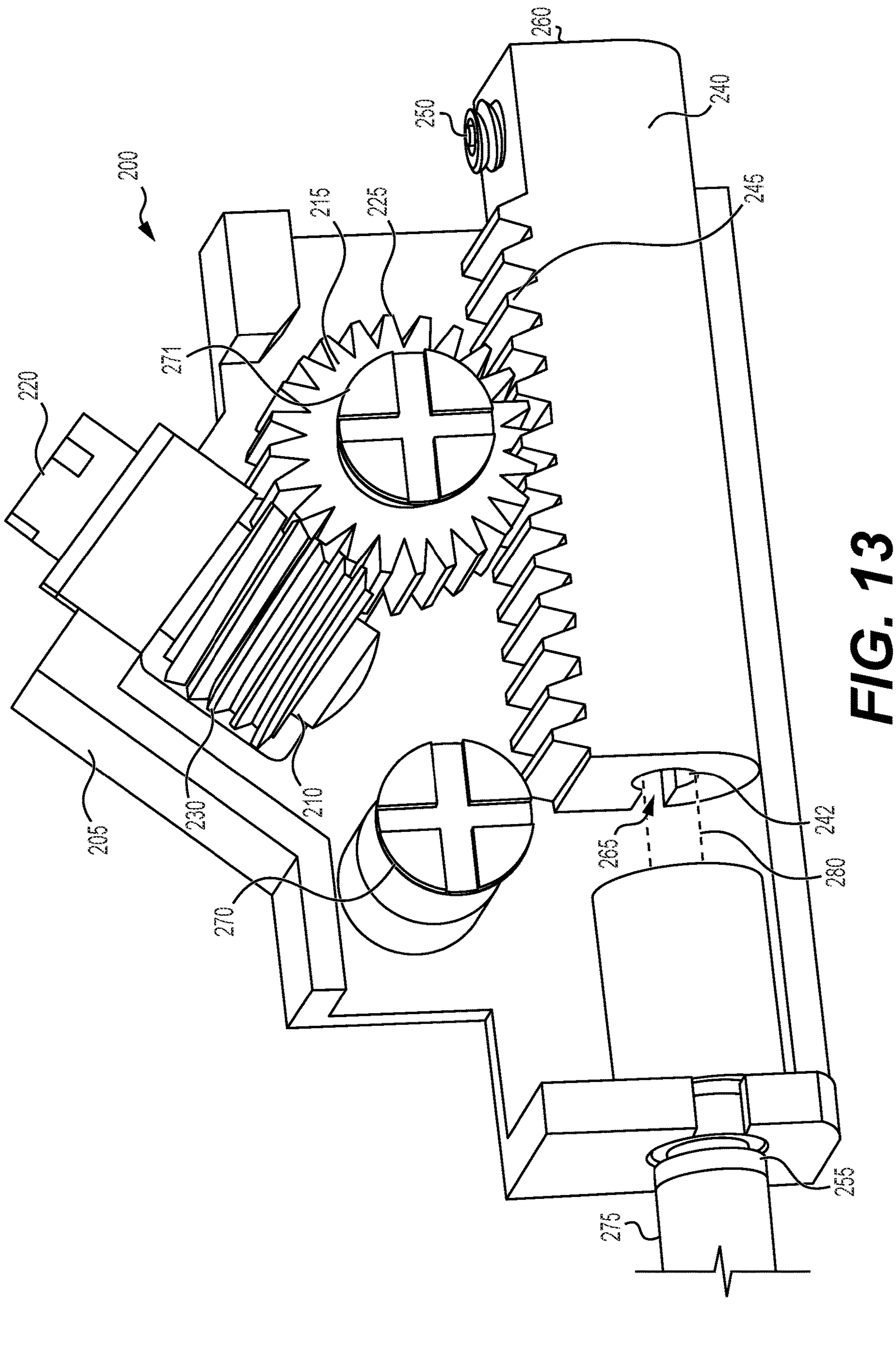
FIG. 13 is a perspective view of a cable tensioner with part of its housing removed.
Figure 14:
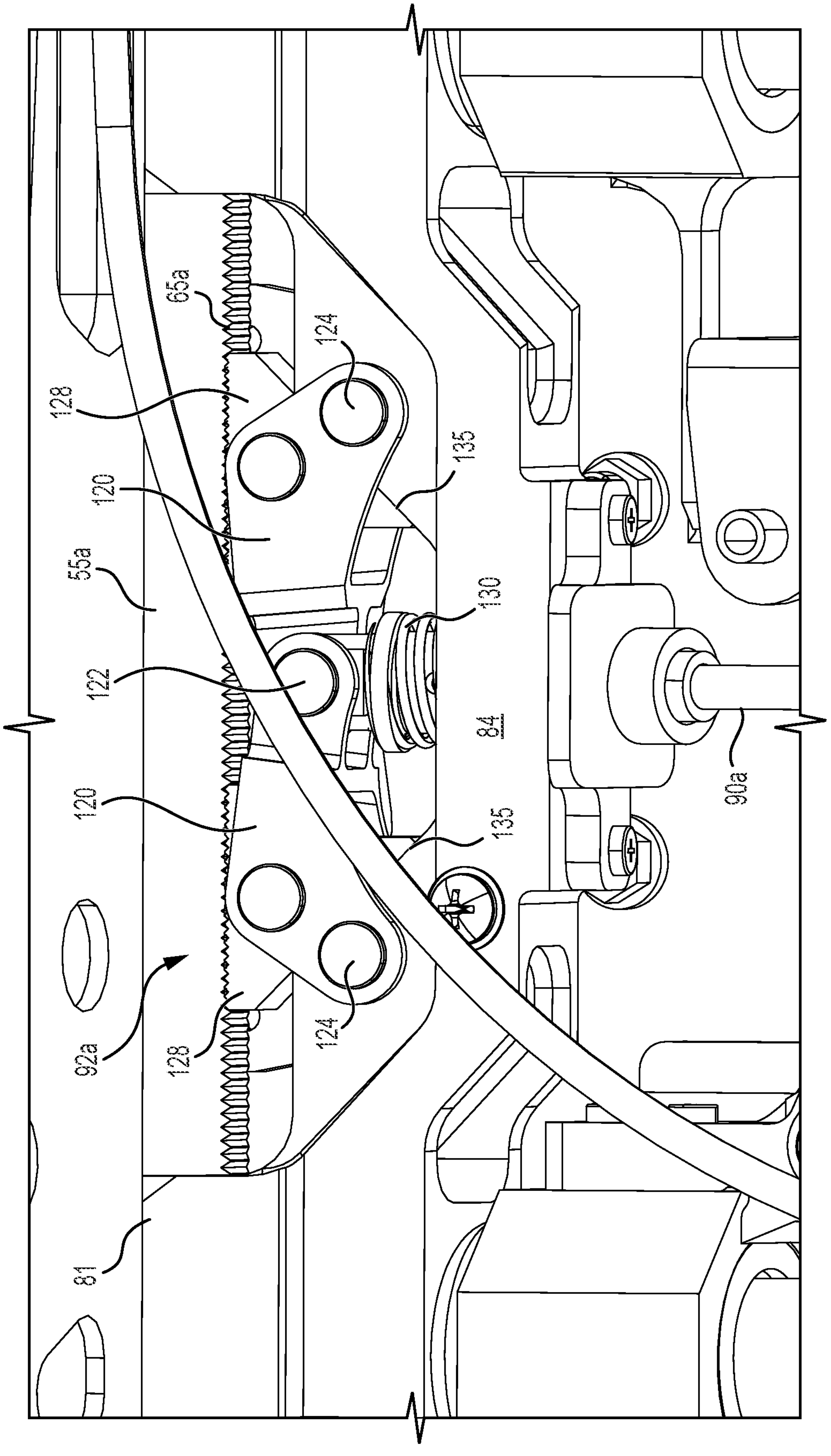
FIG. 14 is an enlarged top perspective view of a first side locking mechanism of the seat positioning system of FIG. 2.
Figure 15:
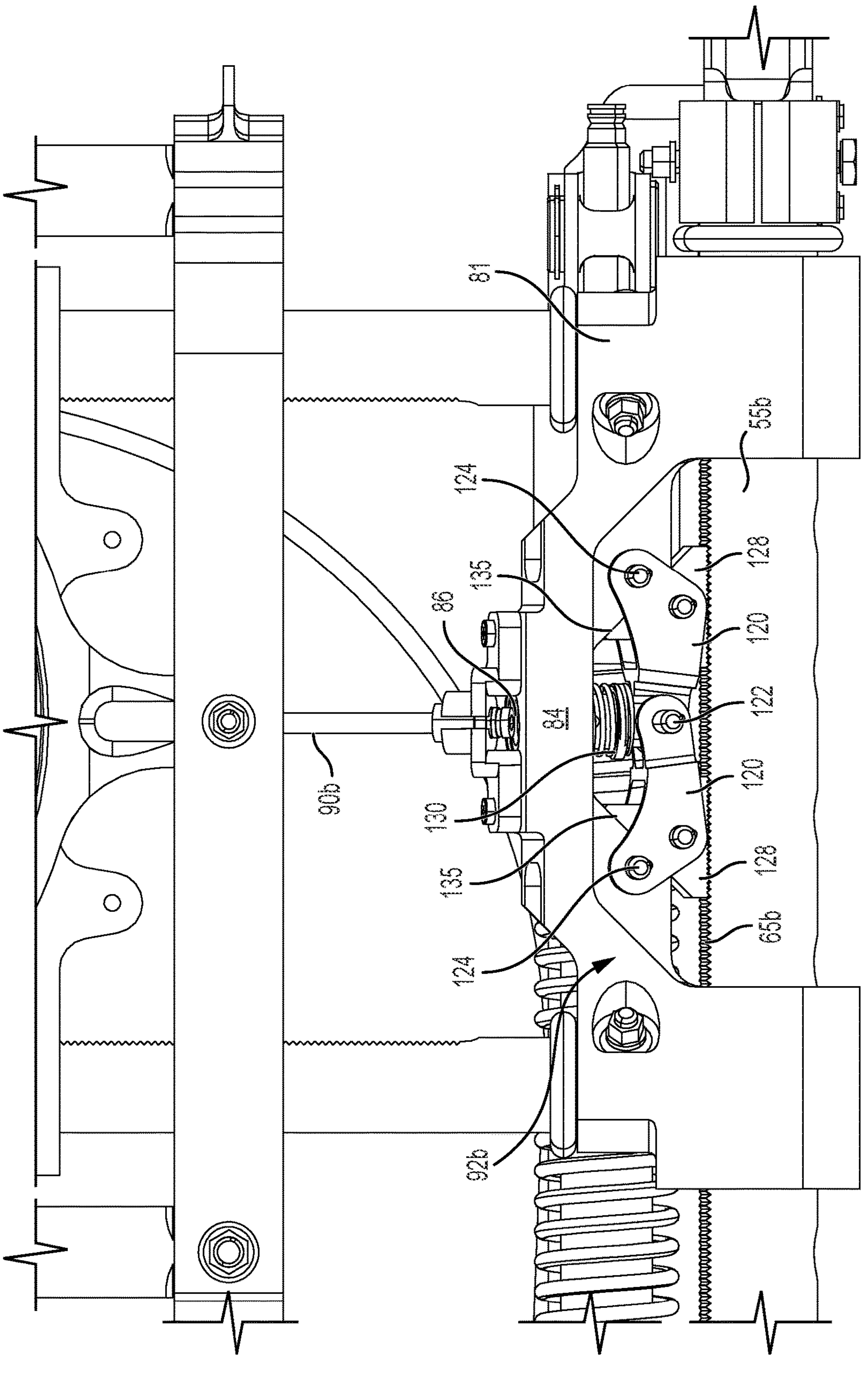
FIG. 15 is an enlarged top view of a second side locking mechanism of the seat positioning system of FIG. 2.

As shown in FIG. 13, a cable tensioner 200 may be utilized to adjust the tension in various cables. Tensioner 200 may be used with several types of cables including those that take the form of flexible members routed through semi-rigid, yet bendable, conduit or sheaths (e.g., Bowden cables). One benefit of cable tensioner 200 is that its configuration allows it to be installed in tight spaces and adjusted using a screwdriver of the like, where traditional tensioners need to be accessible by a person's entire hand. Cable tensioner 200 includes a worm gear arrangement in a housing 205. Housing 205 may be a two-piece or clamshell configuration held together by fasteners such as threaded fasteners 270 and 271. Cable tensioner 200 in FIG. 13 is shown with part of housing 205 removed to better illustrate the internal workings of the tensioner. The worm gear comprises a worm screw (or just worm) 210 engaged with a gear 215. Gear 215 may take a number of forms including a spur gear. The term "worm screw" as used herein is intended to refer only to the rotatable mechanism having spiral threads and not the gear 215 it engages with. The worm screw 210 may include a head 220 such as a Phillips, flat head or hex head that is accessible from outside of housing 205. Gear 215 is located adjacent worm screw 210 with the axis of the gear being perpendicular to the longitudinal axis of the worm screw. As shown in FIG. 13, this orientation causes the teeth 225 of gear 215 to fall between the ridges 230 formed by the threads on worm screw 210. When the worm screw 210 is rotated, the teeth 225 of gear 215 stay within the ridges 230 on one side of the worm screw 210 thereby traveling longitudinally along on worm screw. As the teeth 225 of gear 215 move longitudinally along the screw 210, gear 215 rotates about its axis. Worm screw 210 and its head 220 may be installed at an angled to allow easy access by a screwdriver, Allen wrench, or other tool to engage and turn the screw. As shown in FIG. 13, the orientation of worm screw 210 with respect to other components such as sleeve 240 (discussed below) may form an acute angle or other non-parallel or non-perpendicular angles.

Cable tensioner 200 also includes a sleeve 240 having a channel 242 for receiving the end of a wire or cable. Sleeve 240 is movable within housing 205 and has a series of ridges or teeth 245 on its upper edge. Gear 215 is located such that teeth 225 are received within the ridges 245. When gear 215 is rotated, the teeth 225 move along the ridges 245 causing the sleeve 240 to slide within housing 205. Sleeve 240 includes a set screw 250 accessible from outside housing 205 that can be tightened to clamp a wire or cable within channel 242. Cable tensioner 200 may also include an inlet collar 255 to help align the wire or cable being fed into tensioner 200 with the internal channel 242. Set screw 250 may be operable by a screwdriver, Allen wrench, or other tool to engage and turn the screw.

In use, cable tensioner 200 may be located at the end of any cable or wire 280 requiring tension. The tensioner is typically attached to a fixed structure proximate the cable or wire 280 and the end of the cable or wire is fed through inlet collar 255 and into channel 242. The conduit or sheath 275 for the cable or wire 280 may be secured to inlet collar 255. Tensioner 200 is adapted to be left in place as a permanent part of the system where the tensioned cable or wire is required. Once the cable or wire 280 is fed into channel 242, set screw 250 may be tightened to secure the cable or wire in the tensioner 200. Alternatively, the cable or wire 280 may extend out of an end 260 of sleeve 240 and be secured within channel 242 by a swage fitting or similar fitting (not shown) that has been crimped onto cable or wire 280, where the fitting then catches on end 260 to prevent the cable or wire from being pulled through the channel 242. There may be a slot 265 in sleeve 240 on a side of channel 242 which allows a cable or wire 280 that already has a fitting attached to its end to be placed within the channel.

The user may then turn worm screw 210 by engaging head 220, which results in gear 215 rotating and causing sleeve 240 to slide, thereby adding or reducing tension in the cable or wire as desired. The configuration of the worm screw 210 with respect to gear 215, and more specifically the way teeth 225 interface with ridges 230, cause the components in tensioner 200 (e.g., sleeve 240) to remain fixed with respect to each other when the screw is not being turned. This is true even when a wire under tension is pulling on sleeve 240. Because the components remain fixed with respect to each other when tensioner is not being operated, tensioner 200 can be set and it will maintain the desired tension without further action from a user.

It is to be understood that while certain forms of the present invention have been illustrated and described herein, it is not to be limited to the specific forms or arrangement of parts described and shown. Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

Having thus described the invention, what is claimed as new and desired to be secured by Letters Patent is as follows:

1. A seat positioning system comprising:

a frame having a seat portion and a backrest portion, said seat portion having a front and a back wherein said back is located proximate said backrest portion, said seat portion also having a first side and a second side wherein said first and second sides extend from said front of said seat portion to said back of said seat portion;

a first track having a plurality of serrations;

a second track having a plurality of serrations, said second track oriented generally perpendicular to said first track;

a first locking mechanism having a plurality of serrations, wherein at least some of said serrations on said first locking mechanism are adapted to engage with at least some of said serrations on said first track;

a second locking mechanism having a plurality of serrations, wherein at least some of said serrations on said second locking mechanism are adapted to engage with at least some of said serrations on said second track;

a triggering mechanism adapted to operate said first and second locking mechanisms, said triggering mechanism including a first flexible member and a second flexible member, wherein a first end of said first flexible member is connected to a lever and a second end of said first flexible member is connected to said first locking mechanism, and wherein a first end of said second flexible member is connected to said lever and a second end of said second flexible member is connected to said second locking mechanism; and a handle operable to disengage said first locking mechanism and said second locking mechanism.

2. The seat positioning system of claim 1, further comprising a third track oriented generally perpendicular to said first track, said third track having a plurality of serrations.

3. The seat positioning system of claim 2, further comprising a third locking mechanism having a plurality of serrations, wherein at least some of said serrations on said third locking mechanism are adapted to engage with at least some of said serrations on said third track.

4. The seat positioning system of claim 2, wherein said first, second, and third tracks are tubular members.

5. The seat positioning system of claim 4, wherein said triggering mechanism includes a third flexible member, wherein a first end of said third flexible member is connected to said lever and a second end of said third flexible member is connected to said third locking mechanism.

6. The seat positioning system of claim 5, wherein said triggering mechanism is adapted to also operate said third locking mechanism.

7. The seat positioning system of claim 6, wherein said handle is also operable to disengage said third locking mechanism.

8. The seat positioning system of claim 7, wherein the amount of tension in each of said first, second, and third flexible members is adjustable using barrel adjusters mounted to said lever.

9. A seat positioning system comprising:

a bottom support structure;

a frame having a seat portion and a backrest portion;

a rotatable plate mounted to said bottom support structure, said rotatable plate movable with respect to said bottom support structure;

a first track and a second track, said second track oriented generally perpendicular to said first track;

a first locking mechanism and a second locking mechanism, wherein said first locking mechanism is adapted to engage with said first track to prevent movement of said first track with respect to said first locking mechanism, and wherein said second locking mechanism is adapted to engage with said second track to prevent movement of said second track with respect to said second locking mechanism;

a triggering mechanism configured to activate said first and second locking mechanisms, said triggering mechanism including a first flexible member and a second flexible member, wherein a first end of said first flexible member is connected to a lever and a second end of said first flexible member is connected to said first locking mechanism, and wherein a first end of said second flexible member is connected to said lever and a second end of said second flexible member is connected to said second locking mechanism;

a locking pin to prevent movement of said rotatable plate with respect to said bottom support structure, wherein said locking pin is receivable within an aperture in said bottom support structure; and a handle located proximate said seat portion of said frame, said handle adapted to operate said first locking mechanism, said second locking mechanism, and said locking pin.

10. The seat positioning system of claim 9, further comprising a third track oriented generally perpendicular to said first track.

11. The seat positioning system of claim 10, further comprising a third locking mechanism adapted to engage with said third track to prevent movement of said third track with respect to said third locking mechanism.

12. The seat positioning system of claim 11, wherein said first, second, and third tracks are tubular members.

13. The seat positioning system of claim 12, wherein said handle is also adapted to operate said third locking mechanism.

14. The seat positioning system of claim 13, wherein said locking pin is spring biased in a downward position.

15. The seat positioning system of claim 14, wherein said locking pin has a tapered sidewall.

16. A seat positioning system comprising:

a bottom support structure;

a frame having a seat portion and a backrest portion, said seat portion having a front and a back wherein said back is located proximate said backrest portion, said seat portion also having a first side and a second side wherein said first and second sides extend from said front of said seat portion to said back of said seat portion;

a rotatable plate mounted to said bottom support structure, said rotatable plate movable with respect to said bottom support structure;

a first track having a plurality of serrations;

a second track having a plurality of serrations, said second track oriented generally perpendicular to said first track;

a first locking mechanism having a plurality of serrations, wherein at least some of said serrations on said first locking mechanism are adapted to engage with at least some of said serrations on said first track;

a second locking mechanism having a plurality of serrations, wherein at least some of said serrations on said second locking mechanism are adapted to engage with at least some of said serrations on said second track;

a triggering mechanism adapted to operate said first and second locking mechanisms, said triggering mechanism including a first flexible member and a second flexible member, wherein a first end of said first flexible member is connected to a lever and a second end of said first flexible member is connected to said first locking mechanism, and wherein a first end of said second flexible member is connected to said lever and a second end of said second flexible member is connected to said second locking mechanism;

a locking pin to prevent movement of said rotatable plate with respect to said bottom support structure, wherein said locking pin is receivable within an aperture in said bottom support structure, and wherein a first end of a third flexible member is connected to said lever and a second end of said third flexible member is connected to said locking pin; and a handle located proximate said seat portion of said frame, wherein a first end of a fourth flexible member is connected to said handle and a second end of said fourth flexible member is connected to said triggering mechanism, said handle adapted to operate said triggering mechanism.

17. The seat positioning system of claim 16, further comprising a third track oriented generally perpendicular to said first track, said third track having a plurality of serrations.

18. The seat positioning system of claim 17, further comprising a third locking mechanism having a plurality of serrations, wherein at least some of said serrations on said third locking mechanism are adapted to engage with at least some of said serrations on said third track.

19. The seat positioning system of claim 18, wherein said first, second, and third tracks are tubular members.

20. The seat positioning system of claim 19, wherein said locking pin has a tapered sidewall.

* * * * *